United States Patent
Tajima et al.

(10) Patent No.: US 9,462,509 B2
(45) Date of Patent: Oct. 4, 2016

(54) COMMUNICATION SYSTEM, MOBILE STATION, AND CONTROL DEVICE

(71) Applicant: FUJITSU LIMITED, Kawasaki-shi, Kanagawa (JP)

(72) Inventors: Yoshiharu Tajima, Yokohama (JP); Naoyuki Saito, Yokosuka (JP); Kazuaki Ando, Shibuya (JP); Michiharu Nakamura, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 28 days.

(21) Appl. No.: 14/280,209

(22) Filed: May 16, 2014

(65) Prior Publication Data
US 2014/0341134 A1    Nov. 20, 2014

(30) Foreign Application Priority Data
May 20, 2013 (JP) .................. 2013-106286

(51) Int. Cl.
*H04W 4/00* (2009.01)
*H04W 28/22* (2009.01)
*H04L 1/00* (2006.01)

(52) U.S. Cl.
CPC ............... *H04W 28/22* (2013.01); *H04L 1/00* (2013.01)

(58) Field of Classification Search
CPC ............... H04W 28/00; H04W 28/02; H04W 28/0205; H04W 28/0231; H04W 28/0236; H04W 28/0242; H04W 28/0247; H04W 28/0252; H04W 28/0257; H04W 28/0268; H04W 28/0284; H04W 28/0289; H04L 1/00; H04L 1/0001; H04L 1/0002
See application file for complete search history.

(56) References Cited

U.S. PATENT DOCUMENTS

| | | | |
|---|---|---|---|
| 6,539,205 B1* | 3/2003 | Wan ...................... | H04L 1/0002 370/209 |
| 6,889,050 B1* | 5/2005 | Willars et al. .............. | 455/452.2 |
| 6,937,582 B1* | 8/2005 | Kronestedt ........... | H03M 13/35 370/329 |
| 2003/0156573 A1* | 8/2003 | Tran ...................... | H04L 1/0001 370/349 |
| 2004/0203422 A1* | 10/2004 | Srey et al. ................. | 455/67.11 |
| 2005/0105492 A1* | 5/2005 | Simonsson et al. .......... | 370/332 |

(Continued)

FOREIGN PATENT DOCUMENTS

| | | |
|---|---|---|
| JP | 11-186988 A | 7/1999 |
| JP | 2006-222566 A | 8/2006 |

(Continued)

OTHER PUBLICATIONS

3GPP TR 25.913 V7.3.0, "3rd Generation Partnership Project; Technical Specification Group Radio Access Network; Requirements for Evolved UTRA (E-UTRA) and Evolved UTRAN (E-UTRAN) ," Mar. 2006, pp. 1-18.

(Continued)

*Primary Examiner* — Kevin Mew
(74) *Attorney, Agent, or Firm* — Arent Fox LLP

(57) ABSTRACT

A communication system includes: a base station configured to perform radio communication with a mobile station; and a control device configured to control a rate of transferring data to the base station based on a radio quality between the mobile station and the base station. A control device includes: a memory; and a processor coupled to the memory and configured to: obtain a radio quality between a mobile station and a base station that performs radio communication with the mobile station; and control a rate of transferring data to the base station based on the radio quality.

17 Claims, 12 Drawing Sheets

(56) References Cited

U.S. PATENT DOCUMENTS

| | | | |
|---|---|---|---|
| 2005/0141455 A1* | 6/2005 | Kim | H04W 80/00 370/331 |
| 2006/0056379 A1* | 3/2006 | Battin | H04W 76/022 370/349 |
| 2006/0126577 A1* | 6/2006 | Yano | H04W 36/0088 370/337 |
| 2006/0203731 A1* | 9/2006 | Tiedemann et al. | 370/235 |
| 2006/0245352 A1* | 11/2006 | Kang | H04L 1/0002 370/229 |
| 2007/0201388 A1* | 8/2007 | Shah et al. | 370/300 |
| 2008/0069046 A1* | 3/2008 | Ishii et al. | 370/330 |
| 2008/0194263 A1* | 8/2008 | Usuda et al. | 455/442 |
| 2008/0309748 A1* | 12/2008 | Franceschini et al. | 348/14.01 |
| 2008/0317014 A1* | 12/2008 | Veselinovic | H04L 1/0001 370/380 |
| 2009/0093218 A1* | 4/2009 | Umesh et al. | 455/69 |
| 2009/0168714 A1* | 7/2009 | Tanaka | H04L 1/1671 370/329 |
| 2009/0274108 A1* | 11/2009 | Hayashi et al. | 370/329 |
| 2010/0034185 A1* | 2/2010 | De Bruin et al. | 370/342 |
| 2010/0281322 A1* | 11/2010 | Park | H04L 1/0001 714/748 |
| 2010/0291959 A1* | 11/2010 | Inaida | 455/513 |
| 2013/0021933 A1* | 1/2013 | Kovvali | H04W 28/0236 370/252 |
| 2013/0053040 A1* | 2/2013 | Ebara et al. | 455/436 |

FOREIGN PATENT DOCUMENTS

| | | |
|---|---|---|
| JP | 2009-525704 A | 7/2009 |
| WO | WO 2007/090176 A2 | 8/2007 |

OTHER PUBLICATIONS

3GPP TR 36.913 V8.0.1, "3rd Generation Partnership Project; Technical Specification Group Radio Access Network; Requirements for further advancements for Evolved Universal Terrestrial Radio Access (E-UTRA) (LTE-Advanced)," Mar. 2009, pp. 1-15.

* cited by examiner

COMMUNICATION SYSTEM, MOBILE STATION, AND CONTROL DEVICE

CROSS-REFERENCE TO RELATED APPLICATION

This application is based upon and claims the benefit of priority of the prior Japanese Patent Application No. 2013-106286, filed on May 20, 2013, the entire contents of which are incorporated herein by reference.

FIELD

The embodiment discussed herein is related to a communication system, a mobile station, and a control device.

BACKGROUND

Many mobile communication systems such as mobile phones adopt a cellular system. In the cellular system, a plurality of areas (cells) that are communicable ranges of radio base stations are combined to cover a wider area, and the radio base station with which a mobile terminal communicates is switched along with movement of the mobile terminal to continue communication.

Currently, third generation mobile communication systems such as W-CDMA and CDMA systems are in service. Currently, in addition, High-Speed Downlink Packet Access (HSDPA) which is a high-speed downlink transfer technology, High-Speed Uplink Packet Access (HSUPA) which is a high-speed uplink transfer technology, High Speed Packet Access (HSPA) which is a combination of HSDPA and HSUPA, and Evolved High-Speed Packet Access (HSPA+) which is an evolved version of HSPA are in the mainstream.

Meanwhile, mobile communication systems for the next generation that enable faster communication have been discussed eagerly. In the 3rd Generation Partnership Project (3GPP), Long Term Evolution (LTE)-advanced, which is an evolved version of Long Term Evolution (LTE) which has been in service since around 2010, is discussed. The LTE is described in 3GPP TR25.913 V7.3.0, for example, and the LTE-advanced is described in 3GPP TS36.913 V8.0.1, for example.

Japanese National Publication of International Patent Application No. 2009-525704, for example, describes a technology in which quality and rate information associated with segments of data is analyzed to resize the segments based on the analysis results such that a plurality of segments fit within an available bandwidth of a transmission frame.

Japanese Laid-open Patent Publication No. 11-186988, for example, describes a technology for selecting a mode in which one piece of image data is to be transmitted as code-division-multiplexed into one packet or a mode in which one piece of image data is to be transmitted as divided into a plurality of packets based on the communication path quality estimated by a receiving station.

Japanese Laid-open Patent Publication No. 2006-222566, for example, describes a technology for controlling the modulation level to be applied to a plurality of multiplexed packets for each of the packets based on the transfer path quality of a radio transfer path for transfer of a multimedia content and identification information for identifying the type of the multimedia content.

SUMMARY

According to an aspect of the invention, a communication system includes: a base station configured to perform radio communication with a mobile station; and a control device configured to control a rate of transferring data to the base station based on a radio quality between the mobile station and the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
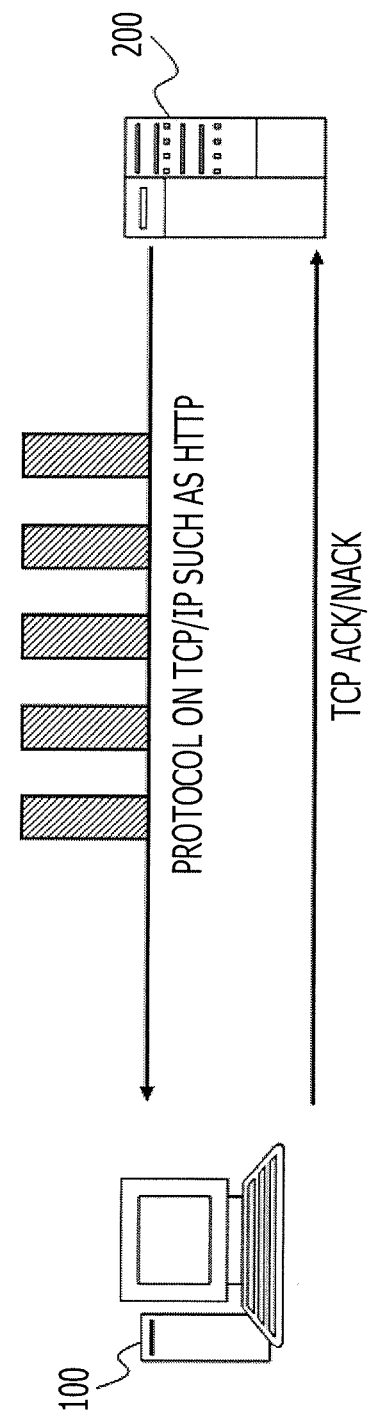
FIG. 1 illustrates transfer of data (for example, movie data) in a wired communication system such as the Internet.

An embodiment will be described below with reference to the drawings. It is to be noted, however, that the embodiment described below is merely exemplary, and not intended to exclude application of a variety of modifications and technologies that are not specified below. In the drawings used to illustrate the following embodiment, the same reference numeral represents the same or similar components unless otherwise noted.

While inventing the present embodiments, observations were made regarding a related art. Such observations include the following, for example.

Currently, viewing movies is one of the most popular uses of the Internet. Although there are various methods to transfer a movie through the Internet, one of the methods currently in the mainstream is to divide and transmit movie data.

In the method, one piece of movie data is divided into a plurality of pieces, which are transferred at intervals of a certain period. In this event, the transfer interval is set such that the movie may be played back without interruption. Thus, the transfer interval is controlled such that data are transferred at shorter intervals for movies at higher transfer rates (with higher qualities) and at longer intervals for movies at lower transfer rates (with lower qualities), for example. Such a control method is advantageous for wired transfer paths, the state of which is uniform and the throughput of which fluctuates only slightly.

In radio communication of the related art such as the W-CDMA and the LTE, however, the quality of the transfer path, in particular the quality of the radio transfer path between a user terminal such as a smartphone and a base station, fluctuates at all times in accordance with the state of radio communication, the number of users who make access at the same time, and so forth. Therefore the movie transfer methods according to the related art tend to result in an interruption of a movie during playback. When such a state occurs, in addition, there remain data that may not be transferred in the base station or a content server, and such data will eventually be discarded, which may be problematic from the viewpoint of the utilization efficiency of the radio system network.

The technologies described in Japanese National Publication of International Patent Application No. 2009-525704, Japanese Laid-open Patent Publication No. 11-186988, and Japanese Laid-open Patent Publication No. 2006-222566 discussed above also do not consider fluctuations in quality of the radio transfer path, and therefore may result in an event in which data that may not be transferred remain in the base station or a content server.

Accordingly, one aspect of the embodiment of the present disclosure provides, for example, techniques for optimizing the rate of transfer of data to a base station.

FIG. 1 illustrates transfer of data (for example, movie data) in a wired communication system such as the Internet. The communication system illustrated in FIG. 1 includes, by way of example, a user terminal 100 and a content server 200, and movie data are transferred from the content server 200 to the user terminal 100 through a wired line such as the Internet.

The transfer is performed, by way of example, in accordance with a protocol on the Transmission Control Protocol/Internet Protocol (TCP/IP) such as the Hypertext Transfer Protocol (HTTP). If the movie data are received normally, the user terminal 100 returns ACK of the TCP to the content server 200. Otherwise, the user terminal 100 returns NACK to the content server 200.

Currently, movie data are transferred through the Internet mainly using a non-real-time method, unlike streaming, such as in a format for display on a browser. Movie data are transferred using systems such as the Dynamic Adaptive Streamingover HTTP (DASH) in which data are transferred as divided.

For example, the content server 200 used for YouTube (registered trademark) or the like divides movie data into pieces of a fixed size (about 1.7 MB), and transmits the movie data in a number of divided pieces and at a period varied in accordance with the length and the quality of the movie. The transfer method used for YouTube or the like is considered to originally assume transfer through a wired transfer path, the state of which is uniform.

Figure 2:
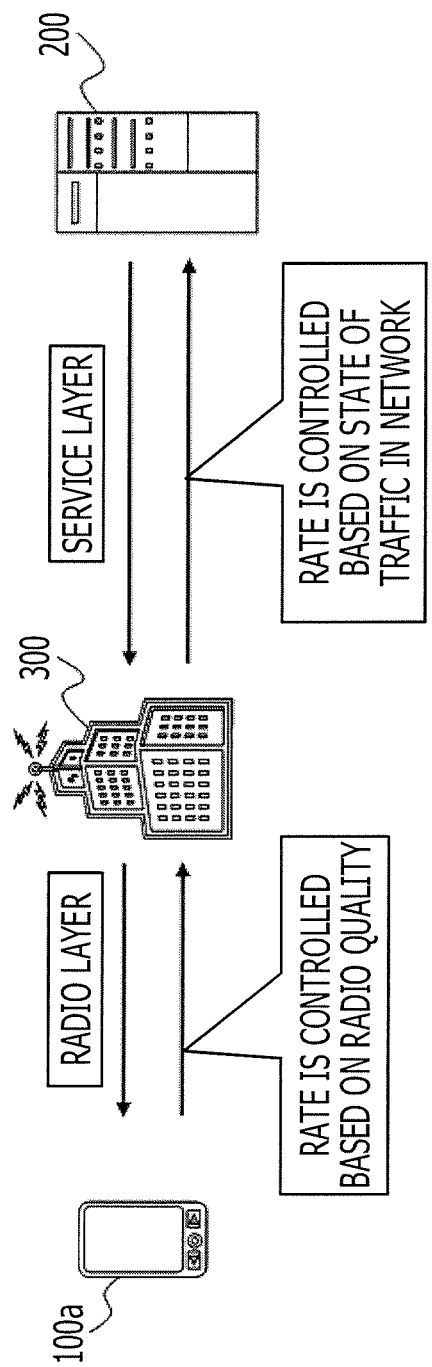
FIG. 2 illustrates mobile transfer.

On the other hand, in mobile transfer, as illustrated in FIG. 2, data from the content server 200 used for YouTube or the like are wirelessly transferred to a user terminal 100a that serves as a mobile station via a base station 300.

In this event, the data transfer rate is controlled independently for a wired segment (service layer) and a radio segment (radio layer). For example, the transfer rate for the radio segment is controlled based on the radio quality, and the transfer rate for the wired segment is controlled based on the state of traffic in the network.

However, the current transfer of movie data does not consider circumstances in which the quality of the transfer path is not uniform as in the radio segment. Therefore, in a mobile environment, movies are played back by the mobile station 100a with a significantly poor quality, or may even hardly be played back.

Figure 3:
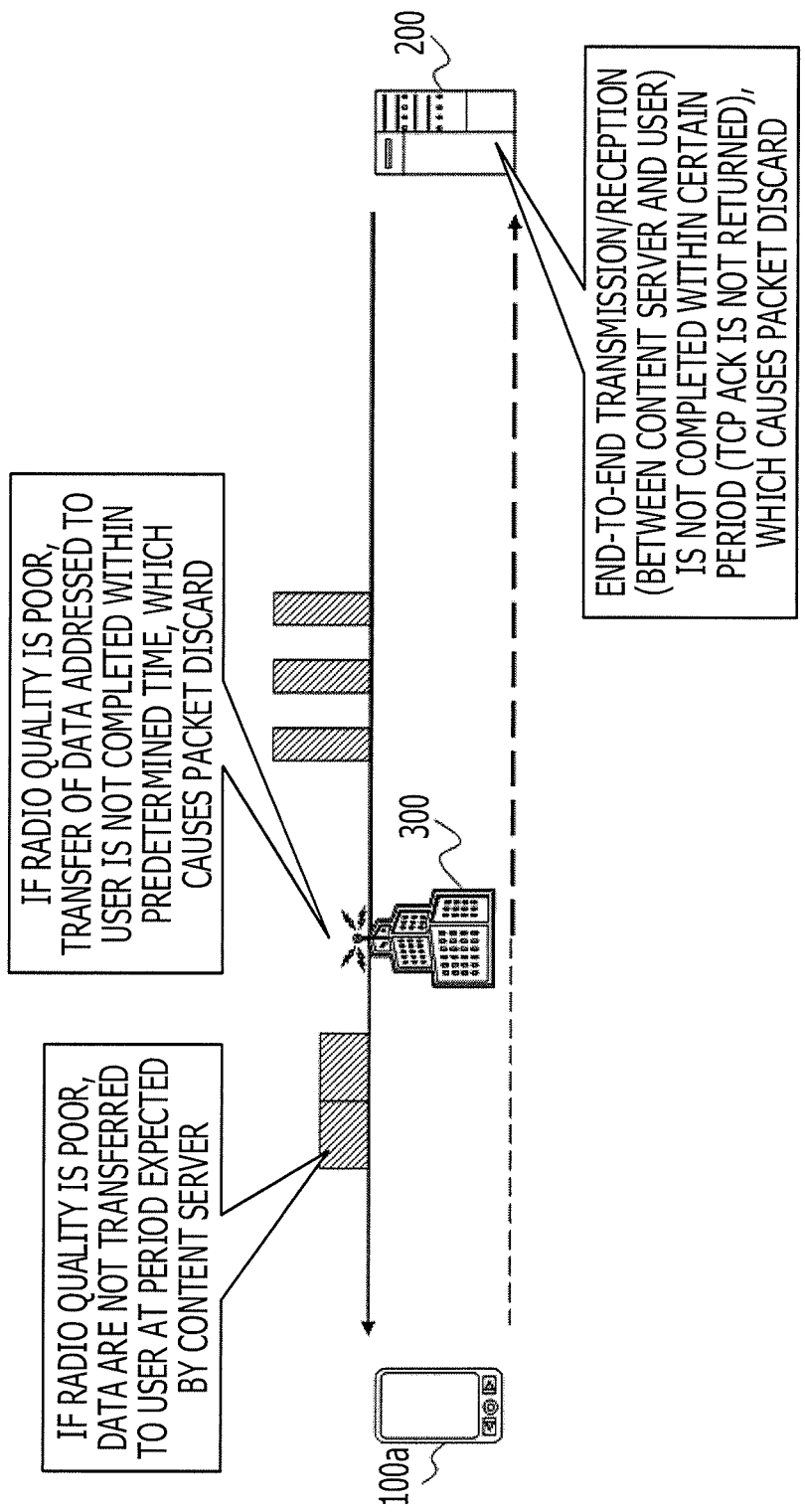
FIG. 3 illustrates an event that may occur in the case where the radio quality is poor in the mobile transfer illustrated in FIG. 2.

This is because data of a predetermined size may not reach the user terminal 100a within a period expected by the content server 200 if the radio quality is poor as illustrated in FIG. 3, for example. Further, the base station 300 does not necessarily have a buffer that is large enough to support a protocol for an upper-level layer, and therefore packet discard may be caused at the base station 300 in the case where the radio quality is poor.

Although packet discard may be avoided by increasing the size of the buffer of the base station 300, an increased buffer size in turn causes data to reside at the base station 300 over a long time. In the meantime, no data arrive at the user terminal 100a, and therefore the user terminal 100a may not return a reception acknowledgement such as ACK/NACK of the TCP to the content server 200. If no delivery acknowledgement is returned from the user terminal 100a to the content server 200, data (packets) will eventually be discarded at the content server 200.

Figure 4:
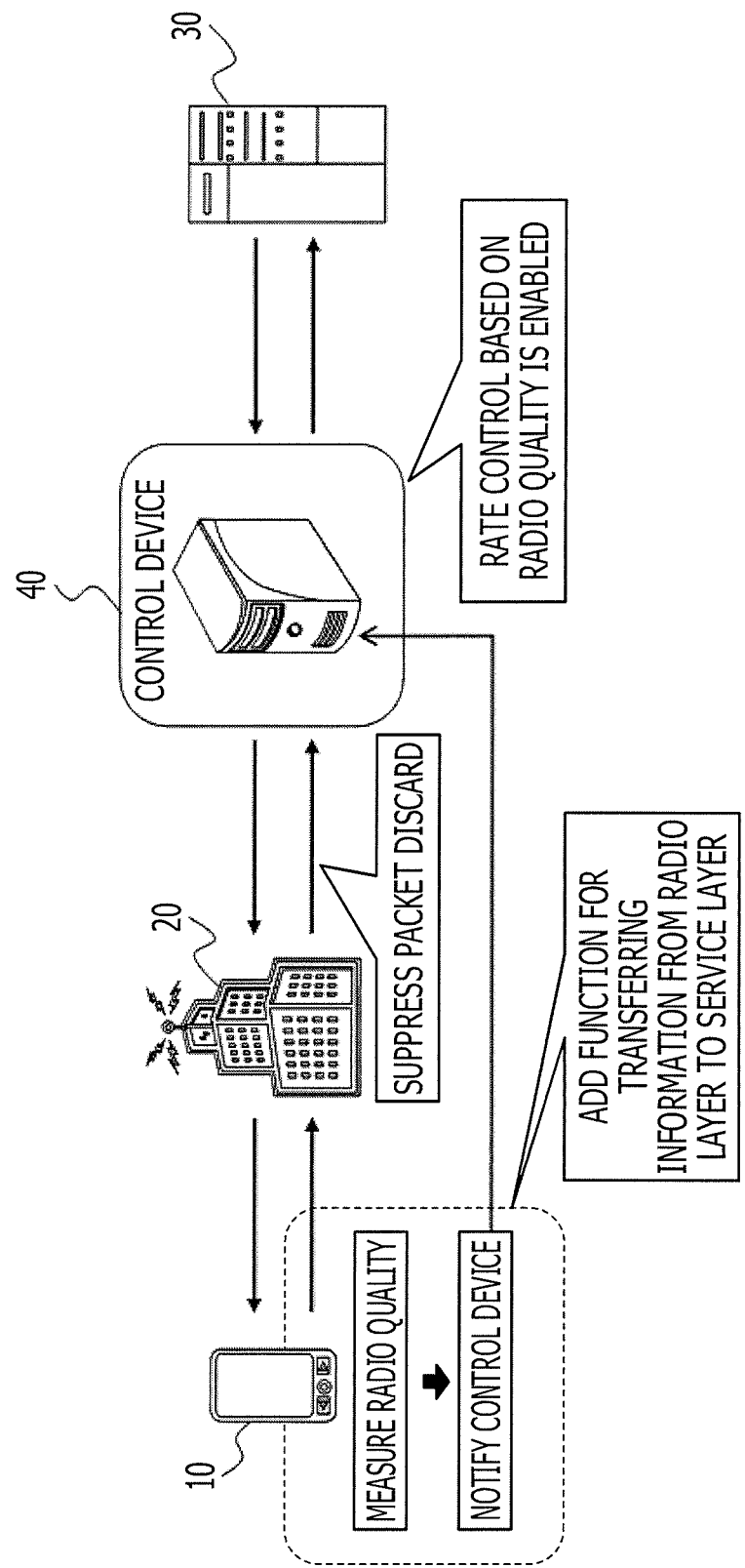
FIG. 4 illustrates an example of the configuration of a communication system according to an embodiment.

Thus, in the embodiment, as illustrated in FIG. 4, for example, a communication system includes a user terminal (mobile station) 10, a base station 20, and a content server 30, and a control device 40 that controls data transfer is installed between the base station 20 and the content server 30.

The user terminal 10 communicates with the base station 20 through a radio transfer path. The user terminal 10 may request transmission (download) of content information (data) from the content server 30 through the base station 20, for example. The content information may contain not only movie data but also sound data, image data, text data, and so forth.

In response to the request from the user terminal 10, the content server 30 transmits the content information addressed to the user terminal 10 which made the request.

In addition, the user terminal 10 periodically measures the quality of the radio transfer path (radio segment), and notifies the control device 40 of the measurement results (radio quality information) through the base station 20.

Examples of the radio quality information include signal to interference ratio (SIR) which indicates the quality of reception at the user terminal 10, received signal strength indicator (RSSI), and reference signal received power (RSRP).

The control device 40 is notified of the radio quality information, by way of example, not by signaling in a physical layer (radio layer) but by signaling in an application layer such as the HTTP which is higher in level than the physical layer. In other words, the radio quality information is sent to the base station 20 after being converted into a format that may not be recognized by the base station 20 but is recognizable by the control device 40. This enables information in the physical layer to be transferred to the control device 40, which corresponds to an upper-level device, without changing the function of or adding a function to the base station 20.

The base station 20 communicates with the control device 40 through a wired transfer path. The base station 20 receives the content information such as movie data transmitted by the content server 30 and addressed to the user terminal 10 through the wired transfer path, and transmits the received content information to the user terminal 10 through a radio transfer path.

The control device 40 transmits the content information received from the content server 30 and addressed to the user terminal 10 to the base station 20 through a wired transfer path. In this event, the control device 40 performs control so as to optimize the rate of data transfer to the base station 20 based on radio quality information received from the user terminal 10 through the base station 20, the content information such as movie data received from the content server 30, and so forth. The control performed by the control device 40 includes, by way of example, control of the data size, the transmission period, and/or the like.

In transferring the content information through a transfer path including a radio segment in this way, the control device 40 provided between the base station 20 and the content server 30 changes the rate of data transfer to the base station 20 in accordance with the radio quality information received from the mobile station 10.

Consequently, a transfer rate that matches the state of the radio segment is set in the wired segment, and thus an appropriate amount of data that matches the state of the radio segment arrives at the base station 20. Thus, the radio frequency may be utilized effectively, and it is less likely that data addressed to the user terminal 10 resides at the base station 20 to cause packet discard.

(Example of Configuration of Mobile Station 10)

An example of the configuration of the user terminal (mobile station) 10 will be described with reference to FIG. 5. The user terminal 10 includes, by way of example, a transmission/reception antenna 101, a receiver 102, a reception quality measuring section 103, an information layer converting section 104, an information notifying section 105, and a transmitter 106.

The transmission/reception antenna 101 transmits and receives a radio signal to and from the base station 20.

The receiver 102 performs prescribed received radio signal processing on the radio signal received by the transmission/reception antenna 101. Non-limiting examples of the received radio signal processing include processes such as filtering, low-noise amplification, AD conversion, demodulation, and error correction.

The reception quality measuring section (radio quality measuring section) 103 measures the radio quality of the radio transfer path based on the radio signal received by the receiver 102.

The information layer converting section 104 converts the results of the measurement performed by the reception quality measuring section 103 (radio quality information) into a format that is not recognized (that is ignored) by the base station 20 but is recognizable by the control device 40 such as signaling in an application layer such as the HTTP.

The information notifying section 105 transmits the radio quality information converted by the information layer converting section 104 and addressed to the control device 40 to the base station 20 through the transmitter 106 and the transmission/reception antenna 101.

The information layer converting section 104 and the information notifying section 105 function as an example of a radio quality notifying section that notifies the control device 40 of the results of the measurement performed by the reception quality measuring section 103.

The functions of the reception quality measuring section 103, the information layer converting section 104, and the information notifying section 105 are implemented, by way of example, by an arithmetic processing unit such as a CPU (not illustrated) by reading prescribed software and data from a storage device such as a memory.

The transmitter 106 performs a process for transmitting a radio signal addressed to the base station 20. Non-limiting examples of the transmission process include processes such as DA conversion, demodulation, and power amplification.

The reception quality measuring section 103, the information layer converting section 104, the information notifying section 105, and the transmitter 106 discussed above function as an example of a transmitting unit. By way of example, the transmitting unit converts a signal that serves as an index of the radio quality of the radio transfer path into a format that is not recognized by the base station 20 but is recognizable by the control device 40, and transmits the converted signal addressed to the control device 40.

Example of Configuration of Control Device 40

Figure 6:
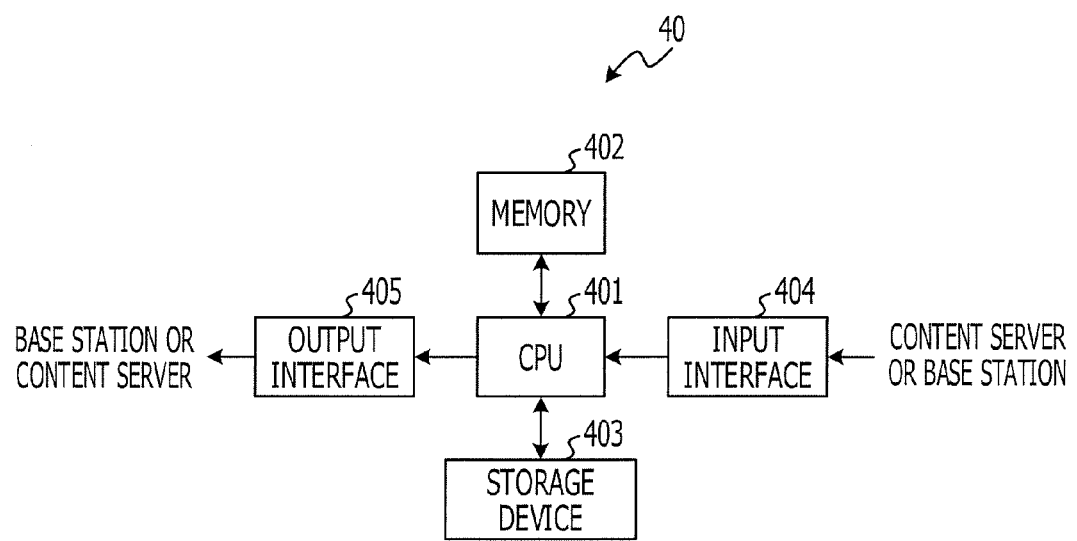
FIG. 6 is a block diagram illustrating an example of the hardware configuration of a control device illustrated in FIG. 4.
Figure 7:
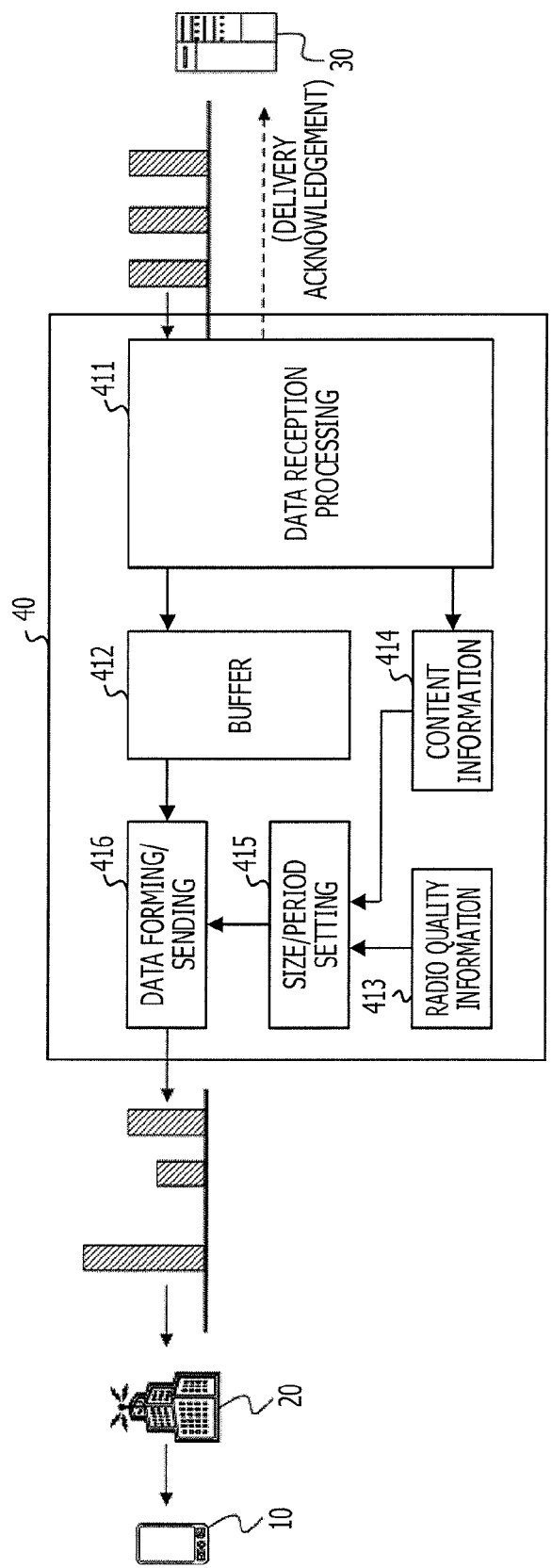
FIG. 7 illustrates an example of the configuration of a communication system depicted with a focus on the function of the control device illustrated in FIG. 4.

FIG. 6 illustrates an example of the hardware configuration of the control device 40. FIG. 7 illustrates an example of the configuration of a communication system depicted with a focus on the function of the control device 40.

The control device 40 illustrated in FIG. 6 includes, by way of example, a CPU 401, a memory 402, a storage device 403, an input interface 404, and an output interface 405.

The CPU 401 controls operation of the entire control device 40 in accordance with a control program (software) and control data stored in the memory 402 and the storage device 403. The CPU 401 operates by reading the control program and the control data from the memory 402 and the storage device 403 to implement a function as a size/period setting section and a data forming/sending section to be discussed later in relation to FIG. 6.

The input interface 404 performs a process for receiving data from the content server 30 and a process for receiving data from the base station 20 (mobile station 10). The process for receiving data from the mobile station 10 includes a process for receiving the radio quality information discussed already.

The output interface 405 performs a process for transmitting data to the content server 30 and a process for transmitting data to the base station 20 (mobile station 10). The process for transmitting data to the content server 30 includes a process for transmitting a reception acknowledgement such as ACK/NACK (responding process). That is, the output interface 405 returns an acknowledgement of data reception from the content server 30 to the content server 30 on behalf of the user terminal 10. This makes it possible to reduce a delay in responding to the content server 30, and to reduce data discard at the content server 30.

Next, as illustrated in FIG. 7, the control device 40 functionally includes a data reception processing section 411, a reception buffer 412, a radio quality information receiving section 413, a content information section 414, a size/period setting section 415, and a data forming/sending section 416.

The data reception processing section 411 is implemented by the input interface 404 discussed above in relation to FIG. 6, for example, and performs a process for receiving the content information received from the content server 30. In addition, the data reception processing section 411 returns a reception acknowledgement (such as ACK/NACK of the TCP) for the received content information to the content server 30 on behalf of the mobile station 10. That is, the data reception processing section 411 functions as an example of a proxy response transmitting section that transmits a reception acknowledgement for data received from the content server 30 to the content server 30 as a proxy for the mobile station 10.

The reception buffer 412 is implemented by the memory 402 and/or the storage device 403 discussed above in relation to FIG. 6, for example, and temporarily stores the content information received by the data reception processing section 411.

The radio quality information receiving section 413 is implemented by the input interface 404 discussed above in relation to FIG. 6, for example, and receives and extracts the radio quality information transmitted by the mobile station 10 as signaling in the application layer, and provides the radio quality information to the size/period setting section 415.

The content information section 414 analyzes the content information from the content server 30 received by the data reception processing section 411 to recognize the size or the like of the content information, for example. The analysis results for the content information are provided to the size/period setting section 415. As discussed later in relation to a first modification, the content information section 414 may analyze the type or the priority of the content information.

The size/period setting section (size/period controlling section) 415 sets (controls) the size and/or the transmission period of data to be transmitted and addressed to the base station 20 based on the radio quality information from the radio quality information receiving section 413 and the analysis results from the content information section 414.

The data size may be set to be large when the radio quality indicated by the radio quality information is good, and to be small when the radio quality indicated by the radio quality information is poor, for example. In addition, the transmission period may be changed in accordance with the data size such that the rate of data transfer to the base station 20 is uniform. For example, the period may be set to be long when the size of data to be transferred is large, and to be short when the size of data to be transferred is small.

In a non-limiting example, if the size of data blocks sent from the content server 30 is A and the period is t, the average throughput is A/t. The size/period setting section 415 sets the data size and/or the transmission period such that the throughput of data to be transferred from the control device 40 to the base station 20 is A/t.

For example, the throughput TP estimated from the received SIR may be represented by Shannon's formula as follows:

$$TP = W \cdot \log_2(1+SIR)$$

where W is the transfer bandwidth. In the case where data of a size TP are sent from the control device to the base station in a unit time, the time t' before the next data are sent is obtained as $t'=(TP/A) \cdot t$.

By way of example, the data forming/sending section 416 retrieves the content information of the size set by the size/period setting section 415 from the reception buffer 412 at the set period (timing), and sends the retrieved content information to the base station 20 through the output interface 405.

Figure 8:
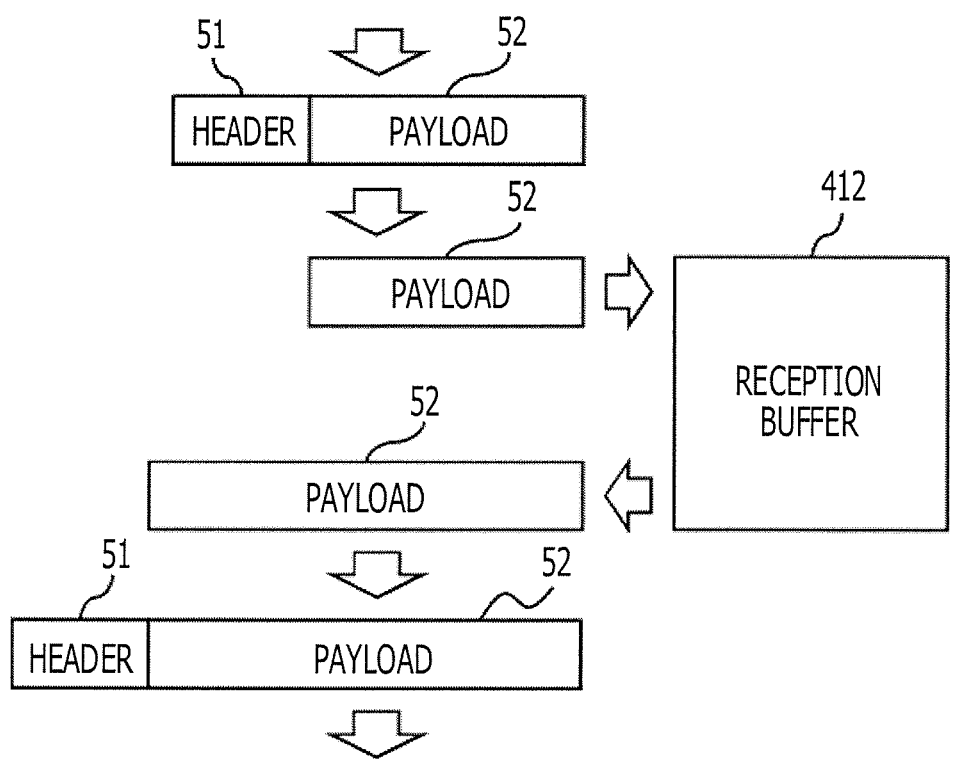
FIG. 8 illustrates an example of a data format for illustrating a data transmission/reception process performed in the control device illustrated in FIG. 4.

Movie data transferred via the Internet or the like have, by way of example, a header 51 and a payload 52 as illustrated in FIG. 8, and the configuration and the size of data stored in the payload 52 are described in the header 51. In the control device 40, the header 51 is analyzed and removed by the data reception processing section 411, and the payload 52 is accumulated in the reception buffer 412. The data forming/sending section 416 stores data (content information) retrieved from the reception buffer 412 in the payload 52, and generates and adds a new header 51 to the payload 52.

The data (content information) contained in the payload 52 are, by way of example, packets of a certain size in which movie and sound are multiplexed on each other. For example, in the case of MPEG2-TS, packets each have a size of 188 bytes. Using such packets as the minimum unit, the data forming/sending section 416 generates data from a number of packets that is the closest to the requested (set) size in retrieving data from the reception buffer 412.

An example of operation of a content transfer service in the communication system configured as discussed above will be described below with reference to FIG. 9.

Figure 9:
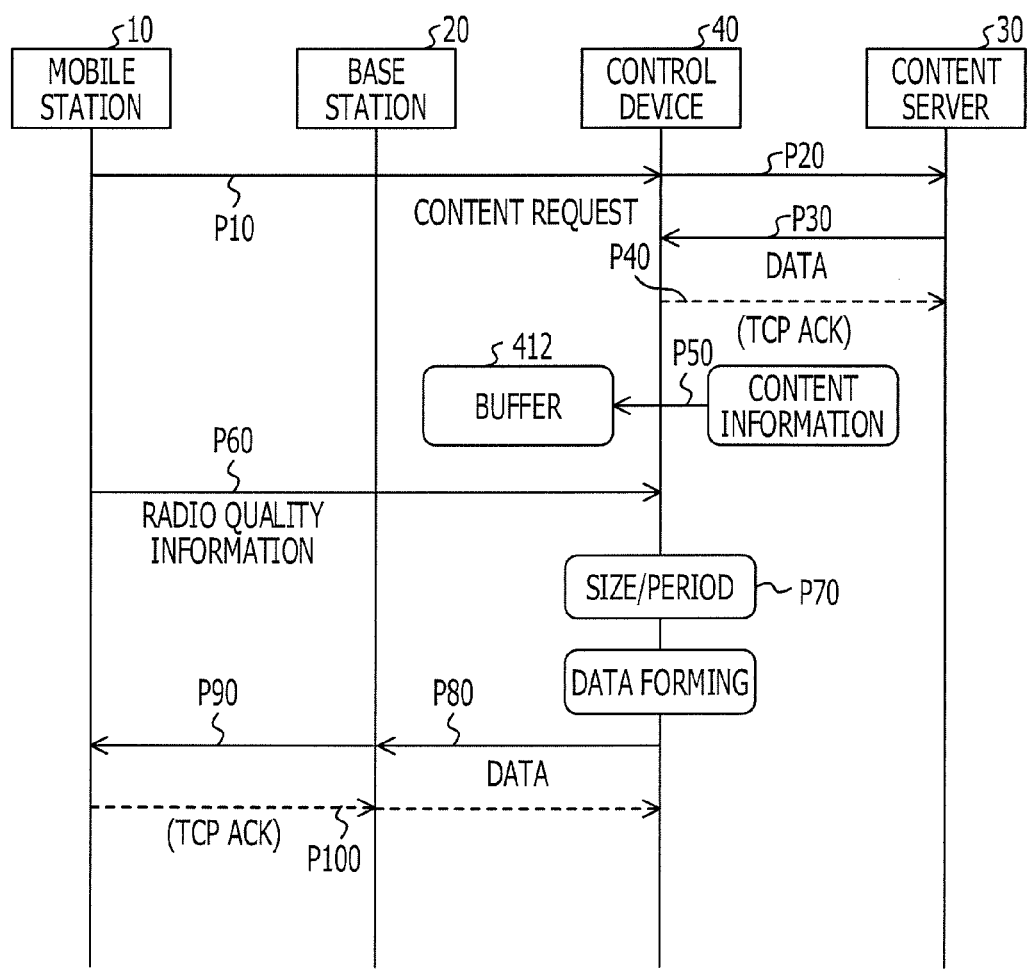
FIG. 9 is a sequence diagram illustrating an example of operation of the communication system illustrated in FIG. 4.

As illustrated in FIG. 9, the mobile station (user terminal) 10 requests transmission of content information addressed to the content server 30. The content request is forwarded to the control device 40 via the base station 20 (process P10).

The control device 40 (CPU) which has received the content request requests the content server 30 through the output interface 405 to transmit content information as a proxy for the mobile station 10 (process P20).

The content server 30 transmits the requested content information to the control device 40 (process P30). The control device 40 returns a reception acknowledgement (such as ACK/NACK of the TCP) from the data reception processing section 411 to the content server 30 (process P40).

The control device 40 determines based on the data type of the content information received from the content server 30 whether or not the content information is to be stored in the reception buffer. In the case where the content information is to be stored in the reception buffer, the control device 40 stores the content information in the reception buffer 412 (process P50).

Meanwhile, the mobile station 10 periodically measures the radio quality information through the reception quality measuring section 103, converts the measurement results into signaling in the application layer through the information layer converting section 104, and transmits the radio quality information addressed to the control device 40 through the information notifying section 105 (process P60).

The control device 40 sets the size and the period of data (content information) to be transferred to the base station 20 based on the radio quality information sent from the mobile station 10 and the content information received from the content server 30 through the size/period setting section 415 (process P70).

The control device 40 transfers data with changed size and period to the base station 20 through the data forming/sending section 416 (process P80). The base station 20 executes scheduling in accordance with the instantaneous radio state, and transmits the data received from the control device 40 to the mobile station 10 (process P90).

When the data are received from the base station 20, the mobile station 10 generates an acknowledgement (such as ACK/NACK of the TCP), and returns the acknowledgement addressed to the control device 40 (process P100).

According to the embodiment described above, the control device 40 enables transfer of data of an appropriate size to the base station 20 at an appropriate period in accordance with the quality of the radio segment between the mobile station 10 and the base station 20. In other words, the rate of transfer to the base station 20 of data addressed to the mobile station 10 may be optimized. Thus, an improvement in utilization efficiency of the radio frequency may be expected. In addition, packet discard at the base station 20 or the content server 30, which may occur during transfer of movies through radio waves, may be suppressed.

First Modification

Figure 10:
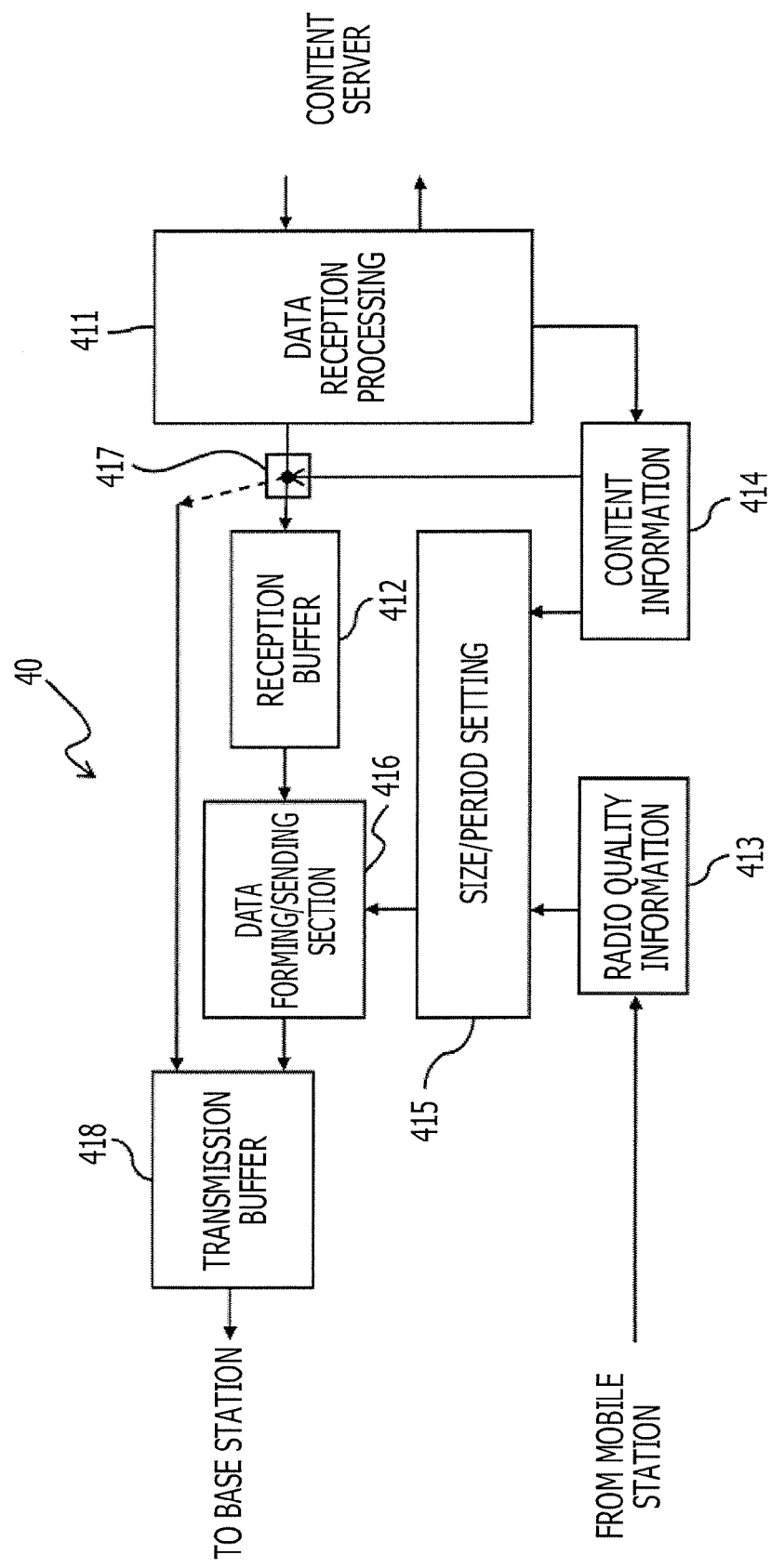
FIG. 10 is a functional block diagram of a control device according to a first modification.

FIG. 10 is a functional block diagram of a control device according to a first modification of the embodiment discussed above.

The control device 40 illustrated in FIG. 10 is different from the configuration illustrated in FIG. 7, by way of example, in including a data switch 417 provided between the data reception processing section 411 and the reception buffer 412 and in including a transmission buffer 418 provided posterior to the data forming/sending section 416. In FIG. 10, a reference numeral that is the same as a reference numeral discussed already denotes a component that is the same as or similar to a component discussed already unless otherwise noted.

The data switch 417 switches the output destination of the content information received by the data reception processing section 411 between the reception buffer 412 and the transmission buffer 418 in accordance with the results of the analysis performed by the content information section 414. For example, in the case where the type of the content information is analyzed by the content information section 414, the content information section 414 determines in accordance with the type of the content information obtained from the analysis whether or not to execute control for data transfer (download) to the base station 20.

In the case where it is determined to execute download control, the content information section 414 switches the output destination of the data switch 417 to the reception buffer 412 to cause the reception buffer 412 to temporarily store the content information received by the data reception processing section 411. In the case where it is determined not to execute download control, on the other hand, the content information section 414 switches the output destination of the data switch 417 to the transmission buffer 418 to cause the transmission buffer 418 to temporarily store the content information received by the data reception processing section 411. In other words, in the case where it is determined not to execute download control, the content information received from the content server 30 bypasses the reception buffer 412 to be temporarily stored in the transmission buffer 418.

Examples of the type of the content information include text data, movie data, image data, and sound data. In the case where the content information is a type of information such as movie data and sound data, the quality of playback by the mobile station 10 for which is considered important (in other words, given priority) compared to other types of content information, the content information section 414 determines to execute download control. Thus, the output destination of the data switch 417 is switched to the reception buffer 412. In the case of content information with relatively low priority, on the other hand, the content information section 414 determines not to execute download control. Thus, the output destination of the data switch 417 is switched to the transmission buffer to bypass the reception buffer 412.

In the case where the content information section 414 determines to execute download control, transfer rate control that is the same as that in the embodiment discussed above is performed. That is, the size/period setting section 415 decides the size and the transmission period of data to be transferred to the base station 20 based on the radio quality information from the mobile station 10 (radio quality information receiving section 413) and the analysis results for the content information from the content server 30 (content information section 414). The decided information is provided to the data forming/sending section 416, which retrieves data of the specified size from the reception buffer 412 at the specified timing to send the retrieved data to the transmission buffer 418.

In this way, the content information section 414 according to the first modification functions as an example of an execution controlling section that controls in accordance with the type of data addressed to the mobile station 10 whether or not the size/period setting section 415 executes transfer rate control.

The transmission buffer 418 temporarily stores data addressed to the base station 20 sent from the data switch 417 or the data forming/sending section 416, and sequentially sends such data to the base station 20. As with the reception buffer 412, the transmission buffer 418 is also implemented by the memory 402 and/or the storage device 403 illustrated in FIG. 6.

In this way, according to the first modification, the control device 40 may control in accordance with the type of the content information from the content server 30 whether or not to perform control for the rate of data transfer to the base station 20 according to the embodiment discussed already. Thus, a further improvement in utilization efficiency of the radio frequency may be expected. In addition, packet discard at the base station 20 and the content server 30 may be further suppressed.

Second Modification

Although radio quality information addressed to the control device 40 is sent from the mobile station 10 in the embodiment and the first modification discussed above, reception acknowledgement information addressed to the control device 40 and indicating completion of reception of data (content information) may be sent in place of the radio quality information. In this event, by way of example, the mobile station 10 may monitor whether or not each piece of divided data transferred from the content server 30 via the control device 40 has been received, and when such reception is completed, may transmit a notification indicating the reception and addressed to the control device 40.

In this case, the control device 40 may estimate the quality of the radio segment based on the time since data are transferred to the base station 20 until a reception completion notification transmitted by the mobile station 10 is received and the size of the data transferred to the base station 20.

Thus, in the control device 40, the size/period setting section 415 may set the size and the transmission period of data to be transferred to the base station 20 in the same manner as in the embodiment discussed already based on the estimated value of the quality of the radio segment.

Figure 11:
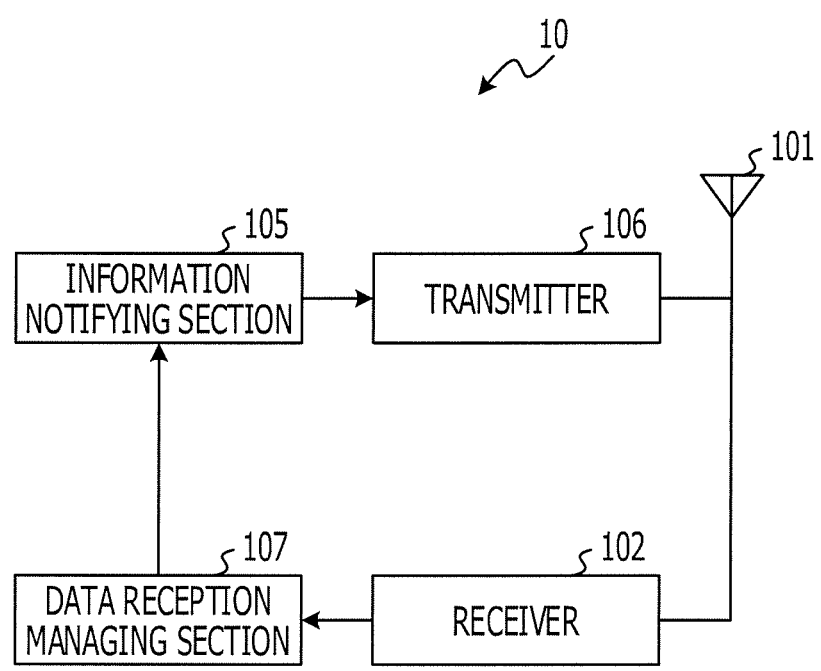
FIG. 11 is a functional block diagram of a mobile station (user terminal) according to a second modification.
Figure 12:
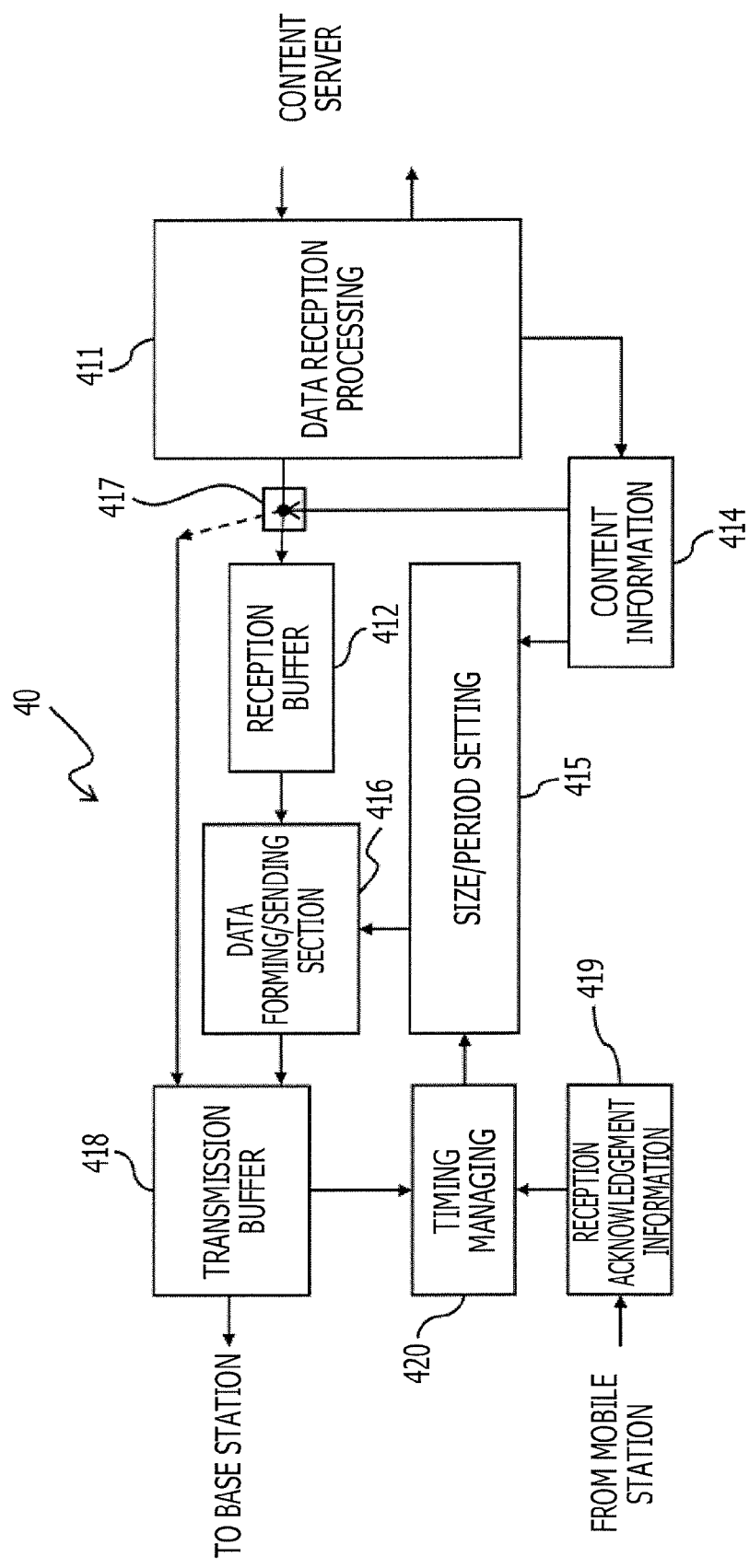
FIG. 12 is a functional block diagram of a control device according to the second modification.

FIG. 11 is a functional block diagram of the mobile station 10 according to the second modification. FIG. 12 is a functional block diagram of the control device 40 according to the modification.

Figure 5:
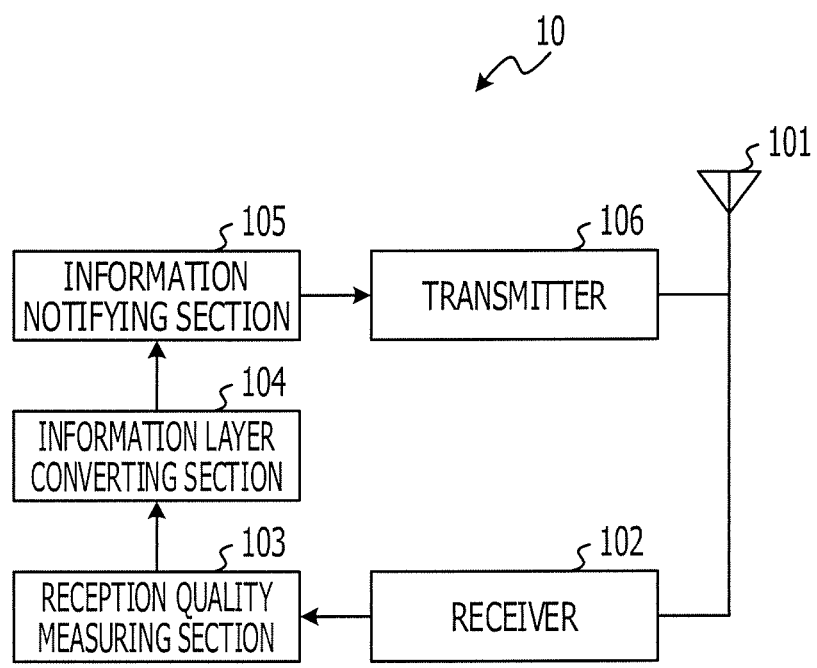
FIG. 5 is a functional block diagram of a mobile station (user terminal) illustrated in FIG. 4.

As illustrated in FIG. 11, by way of example, the mobile station 10 according to the second modification is different from the configuration illustrated in FIG. 5 in including a data reception managing section 107 in place of the reception quality measuring section 103 and the information layer converting section 104. In FIG. 11, a reference numeral that is the same as a reference numeral discussed already denotes a component that is the same as or similar to a component discussed already unless otherwise noted.

By way of example, the data reception managing section 107 generates reception completion notifying information addressed to the control device 40 upon each completion of reception of data (content information), and inputs the generated information to the information notifying section 105. Consequently, a reception completion notification addressed to the control device 40 is transmitted from the information notifying section 105 through the transmitter 106 and the transmission/reception antenna 101.

In other words, the data reception managing section 107 and the information notifying section 105 function as an example of a reception completion notifying section that transmits a reception completion notification for data, the reception completion notification being addressed to the control device 40.

Meanwhile, as illustrated in FIG. 12, by way of example, the control device 40 according to the second modification is different from the configuration according to the first modification illustrated in FIG. 10 in including a reception acknowledgement information receiving section 419 and a timing managing section 420 in place of the radio quality information receiving section 413. In FIG. 12, a reference numeral that is the same as a reference numeral discussed already denotes a component that is the same as or similar to a component discussed already unless otherwise noted.

The reception acknowledgement information receiving section 419 is implemented by the input interface 404 illustrated in FIG. 6, for example, and receives a reception completion notification (reception acknowledgement) indicating completion of data reception at the mobile station 10 discussed above from the mobile station 10.

The timing managing section 420 compares the timing when data are sent from the transmission buffer 418 to the base station 20 and the timing when the reception completion notification is received by the reception acknowledgement information receiving section 419. A timing difference, which is the comparison results, indicates the time consumed since data are transmitted to the base station 20 until the reception completion notification is received. That is, the timing managing section (radio quality estimating section) 420 may estimate the state of reception (radio quality) at the mobile station 10 based on the timing difference.

The size/period setting section 415 decides the rate of transfer to the base station 20 (the size and the transmission period of data) based on the radio quality information provided from the timing managing section 420 and the analysis results from the content information section 414. The decided information is provided to the data forming/sending section 416.

The data forming/sending section 416 retrieves data of the size specified by the size/period setting section 415 from the reception buffer 412 at the specified timing, and sends the retrieved data to the transmission buffer 418.

The switching control for the data switch 417 is the same as that according to the first modification. While the reception acknowledgement information receiving section 419 and the timing managing section 420 are added to the first modification (FIG. 10) in the second modification discussed above, the reception acknowledgement information receiving section 419 and the timing managing section 420 may be added to the configuration illustrated in FIG. 7. In other words, the data switch 417 and the bypass route from the data reception processing section 411 to the transmission buffer 418 may be omitted from the configuration illustrated in FIG. 10.

According to the second modification described above, the effect that is the same as that of the embodiment and the first modification discussed already may be obtained. Besides, the configuration of the mobile station 10 may be simplified because the mobile station 10 does not measure the radio quality and notify the control device 40 of the measurement results.

Other Configurations

In the embodiment and the modifications discussed above, the control device 40 is provided separately from the base station 20 and the content server 30, and installed between the base station 20 and the content server 30. However, the function of the control device 40 discussed above may be incorporated as one function of the base station 20 or the content server 30.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication system comprising:
a base station configured to perform radio communication with a mobile station; and
a control device configured to control a rate of transferring data to the base station based on a radio quality between the mobile station and the base station,
wherein the mobile station is configured to:
convert a signal that serves as an index of the radio quality into a format that is not recognized by the base station but is recognizable by the control device, and
transmit the converted signal addressed to the control device via the base station.

2. The communication system according to claim 1, wherein the mobile station is further configured to:
perform a measurement of the radio quality, and
notify the control device of a result of the measurement.

3. The communication system according to claim 2, wherein the mobile station is further configured to convert the result of the measurement into signaling in an application layer that is higher in level than a radio layer.

4. The communication system according to claim 1, wherein the mobile station is further configured to:
receive the transferred data from the base station, and
transmit a notification signal notifying a completion for receiving the transferred data, the notification signal being addressed to the control device, and
wherein the control device is configured to estimate the radio quality based on a time since the data are transferred until the notification signal is received.

5. The communication system according to claim 1, wherein the control device is further configured to execute control of at least one of: a size and a period of the data addressed to the mobile station based on the radio quality and a size of the data addressed to the mobile station.

6. The communication system according to claim 5, wherein the control device is further configured to control whether the control device executes the control in accordance with a type of the data addressed to the mobile station.

7. The communication system according to claim 1, wherein the control device is further configured to:
receive the data addressed to the mobile station from a server that transfers the data to the base station, and
transmit, as a proxy for the mobile station, a reception acknowledgement for the data addressed to the mobile station to the server.

8. The communication system according to claim 1, wherein the control device is further provided between the base station and a server that transfers the data addressed to the mobile station.

9. The communication system according to claim 1, wherein the control device is further incorporated in a server that transfers the data addressed to the mobile station.

10. A mobile station comprising:
a memory; and
a processor coupled to the memory and configured to perform radio communication with a base station, a rate of transferring data to the base station being controlled by a control device based on a radio quality between the mobile station and the base station,
wherein the processor is further configured to:
convert a signal that serves as an index of the radio quality into a format that is not recognized by the base station but is recognizable by the control device, and
perform transmission of the converted signal addressed to the control device via the base station.

11. The mobile station according to claim 10, wherein the processor is further configured to:
perform a measurement of the radio quality, and
notify the control device of a result of the measurement.

12. The mobile station according to claim 11, wherein the processor is further configured to convert the result of the measurement into signaling in an application layer that is higher in level than a radio layer.

13. The mobile station according to claim 10, further comprising:
a receiver configured to receive the transferred data from the base station; and
a transmitter configured to transmit a notification signal notifying a completion for receiving the transferred data, the notification signal being addressed to the control device and being used by the control device to estimate the radio quality between the base station and the mobile station based on a time since the data are transferred to the base station until the notification signal is received.

14. A control device comprising:
a memory; and
a processor coupled to the memory and configured to:
obtain a radio quality between a mobile station and a base station that performs radio communication with the mobile station;
control a rate of transferring data to the base station based on the radio quality; and
estimate the radio quality based on a time since the data are transferred until a notification signal is received, which notifies a completion for receiving the transferred data and is transmitted from the mobile station that receives the transferred data from the base station.

15. The control device according to claim 14, wherein the processor is further configured to:
receive the data addressed to the mobile station from a server that transfers the data to the base station, and
transmit, as a proxy for the mobile station, a reception acknowledgement for the data addressed to the mobile station to the server.

16. The control device according to claim 14, wherein the processor is further configured to execute control of at least one of: a size and a period of the data addressed to the mobile station based on the radio quality and a size of the data addressed to the mobile station.

17. The control device according to claim 16, wherein the processor is further configured to control whether the processor executes the control in accordance with a type of the data addressed to the mobile station.

* * * * *